Patented Dec. 5, 1922.

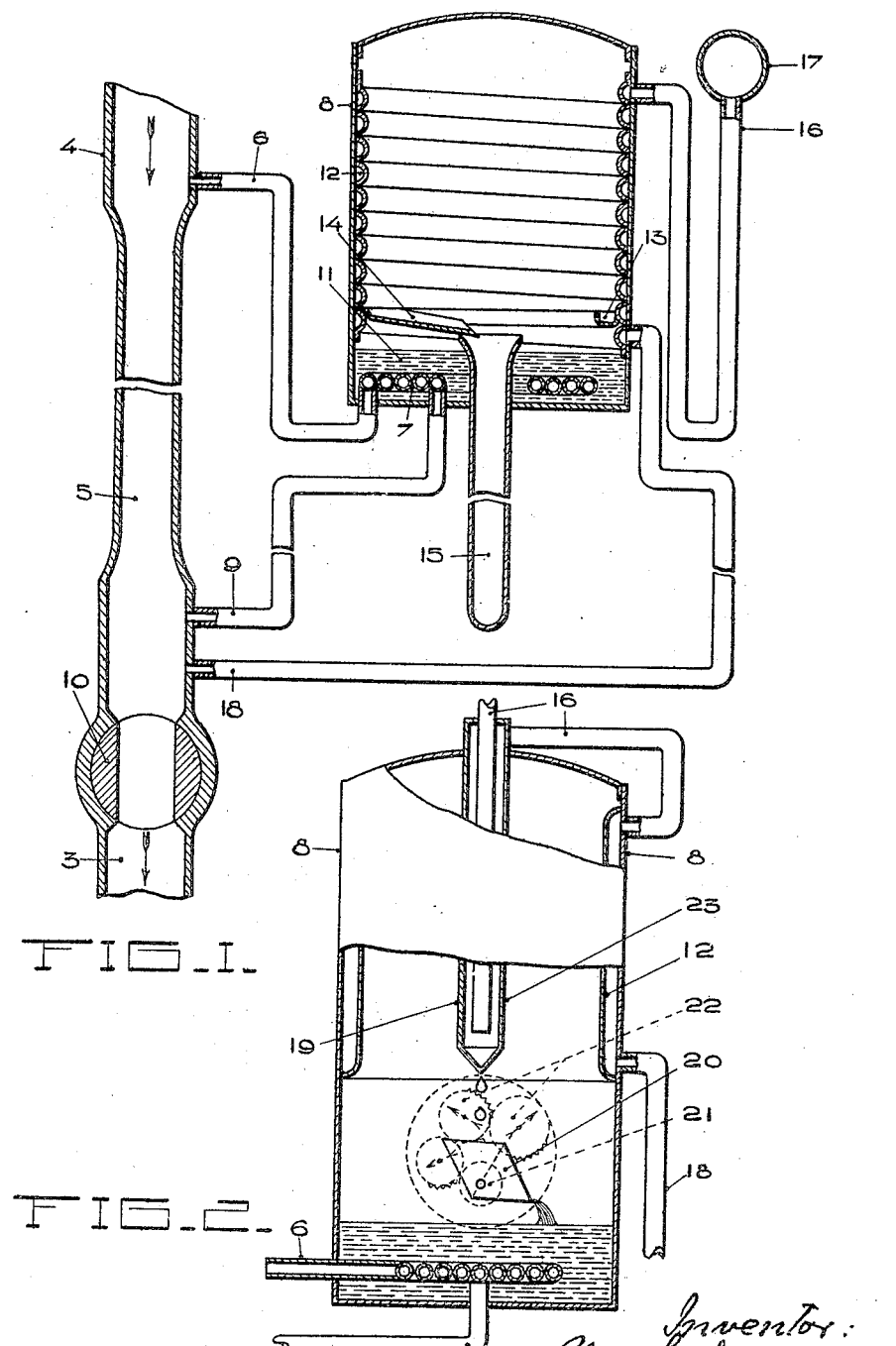

1,437,614

UNITED STATES PATENT OFFICE.

VIGGO STEPHAN KELLNER PETERSEN, OF GENTOFTE, NEAR COPENHAGEN, DENMARK.

MEASURING THE CONSUMPTION OF HEAT.

Application filed July 21, 1921. Serial No. 486,628.

*To all whom it may concern:*

Be it known that VIGGO STEPHAN KELLNER PETERSEN, citizen of the Kingdom of Denmark, residing at No. 3 Sponnecksvej, Gentofte, near Copenhagen, Denmark, has invented certain new and useful Improvements in Measuring the Consumption of Heat, of which the following is a specification.

My invention relates to the measuring of heat quantities and more especially the amount of heat emitted from radiators or groups of radiators, from hot water cocks, or steam cocks or from other places of heat consumption belonging to a central heating plant.

My invention consists chiefly in this that the heat of a certain known part of the heat of the heating agent, hot water, steam or the like, which at any time is taken out of or passed through the radiators or the like, is transmitted to an evaporable medium which thereby develops vapours in quantities corresponding to the heat quantities transmitted to it. These vapours are condensed and the condensate, formed during a certain period, or a known part thereof, is measured in a suitable way, this measure thus giving a measure of the consumption of heat during that period.

The condensate, or the known part thereof, may be intercepted in a graduated tube whose scale indicates the real heat consumption in calories or it may be brought to influence a counting device or may be weighed or measured in other suitable ways.

The evaporation of the evaporable medium and the condensation of the vapours may be effected in an evacuated space, i. e. a space only containing the medium and its vapours, whereby variable resistances against the evaporation and against the movement of the vapours from the evaporating place to the condensing place are avoided.

A heat measuring device arranged according to the new principles above set forth is diagrammatically shown in the drawing. Fig. 1 shows one form of execution and Fig. 2 a modified form.

In the example shown Fig. 1, the measuring device is intended for measuring the heat consumption by tapping of hot water through a cock 3. In the hot water conduit 4 there is, after a branch tube 6, inserted a calibrated tube 5. The branch tube 6, whose inner diameter is a certain little part of the inner diameter of the calibrated tube, is connected with one end of a coil 7 in a container 8. The other end of the said coil is through a tube 9 connected with the conduit 4 at a point after the calibrated tube. When the cock 3 is opened the hot water passes partly through the calibrated tube 5 and partly through the tubes 6, 7 and 9, the quantity of water passing through the latter being a certain known part of that passing through the calibrated tube. Consequently, a corresponding small part of the heat quantity, taken away at any time, is transmitted to the container 8.

This container is evacuated and its lower part where the coil 7 lies contains the evaporable medium 11, i. e. a liquid of any suitable kind, of any suitable boiling point, say water, alcohol, hydro-carbon, mercury or the like. The upper part of the container is provided with a cooling jacket 12 having at the bottom a gutter 13 whose outflow 14 opens into a measuring tube 15.

The cooling jacket 12 has its inlet tube 16 connected with a cold water conduit 17 and its outlet tube 18 with the hot water conduit 4. Consequently, when the cock 3 is opened, cold water will pass through the tubes 16 and 18 and the cooling jacket 12. The temperature of the water in the conduit 17 and in the cooling jacket corresponds to the initial temperature of the water before entering the conduit 4. Consequently, between the cooling jacket and the branch tube 6, there is a difference of temperature just equal to that number of heat degrees for which the water in the conduit 4 has been heated.

Now, in the container 8 filled with the medium 11, partly in the liquid, partly in the vapor state, the molecules of the medium move in the direction of the fall of temperature, the vapours being condensed along the cooling jacket 12 and new quantities of vapours being generated at the coil 7. The greater the difference of temperature and the longer the time during which this difference is maintained, is the quicker the transport and the greater the quantity transported.

The factors determining the heat exchange between the water in the coil and the medium are such that the water is cooled down to the temperature of the cooling jacket, or to a certain higher temperature, so that the heat transmitted to the container is absorbed either completely or to a known degree.

Under these circumstances, the vaporized medium condensed, during a certain period, along the cooling jacket and running toward the gutter 13 gives, after the necessary calculations, an exact measure for the heat quantities consumed through the tapping of hot water during that period. From the gutter 13 the condensed medium runs into the measuring tube 15 which directly indicates the real consumption of heat, the calculations above mentioned have already been taken into consideration in the graduation of the tube.

When the consumption of heat of the period or periods in question has been ascertained, the apparatus can be made ready for a new measuring of heat by the liquid of the measuring tube being emptied into the container. For this purpose the apparatus may be arranged so as to enable the measuring tube to be turned upside down, which may be attained by the provision of flexible connections, at suitable points of the tubes 6, 9, 16 and 18.

Instead of measuring the total quantity of the medium condensed along the cooling surface I may, in some cases, only measure the quantity condensed along a certain known part of the cooling surface. Thus in the embodiment shown in Fig. 1 I may so arrange the gutter 13 that it will intercept the condensed medium only from a certain section of the cooling jacket.

Another way for measuring only a part of the condensed medium is shown in Fig. 2. According to this figure there is provided in addition to the cooling jacket 12 a central cooling surface 19. The quantity of the medium condensed at the cooling jacket runs directly down toward the liquid medium in the bottom of the container 8, without being measured, while the smaller quantity of the medium condensed by the central cooling surface 19 is measured.

Furthermore Fig. 2 shows another way of measuring. Instead of allowing the condensed medium or a certain part thereof to run into a measuring tube, I let it actuate a device similar to a hydraulic motor which, in turn, operates a counting mechanism such as used in gas-meters, water-meters or the like. According to Fig. 2, the condensed medium formed along the cooling surface 19 drops into an automatic tilting device 20 having two alternating chambers. Each time this tilting device swings to the one side i. e. every other time it actuates the first member 21 of a counting mechanism 22 thus permitting a quantity of liquid corresponding to the filling of both chambers of the tilting mechanism to move the counting device one step.

I do not confine myself to the measuring tube shown in Fig. 1, as I can measure or weigh the condensed medium or a certain part thereof in any suitable well-known manner for instance as is done by apparatus for measuring the rain-fall, nor do I confine myself to the measuring device shown in Fig. 2, since I can use any other hydraulic motor element than the tilting device shown. Furthermore, the coil 7, the cooling jacket 12 and the other details shown are only to be considered as examples which may be altered in many different ways.

When using the apparatus for measuring the heat consumption from radiators or the like, I connect the tube 6 or the like with the heating agent conduit to the radiator or radiators in question, while the tube 16 or the like is connected with the return conduit. Thus the result of the measuring operation corresponds to the heat quantities required for reheating the return-water.

I claim:

1. The process for measuring heat quantities in a heating agent which consists in transmitting the heat of a certain known part of the heat of the heating agent to an evaporable medium, condensing the vapours thus produced, and measuring either the entire condensate or a certain known part thereof.

2. The process for measuring heat quantities in a heating agent which consists in transmitting the heat of a certain known part of the heat of the heating agent to an evaporable medium, condensing the vapours at a temperature equal to the initial temperature of the heating agent before its heating, and measuring either the entire condensate or a certain known part thereof.

3. The process for measuring heat quantities in a heating agent which consists in transmitting a certain known part of the heat of the heating agent to an evaporable medium, evaporating this medium in vacuum, condensing the vapours thus produced in the same vacuum, and measuring either the entire condensate or a certain known part thereof.

4. Apparatus for measuring heat quantities in heating plants comprising a container, an evaporable medium in said container, a heating element capable of transmitting the heat of a certain known part of the heat of the heating plant to the said medium, a cooling element capable of condensing the vapours generated from the medium, and means for measuring the condensate.

5. Apparatus for measuring heat quantities in heating plants comprising a container, an evaporable medium in said container, a heating element capable of transmitting the heat of a certain known part of the heat of the heating agent of the heating plant to the said medium, a cooling element capable of condensing the vapours of the medium at the initial temperature of the heating agent before its heating, and means for measuring the condensate.

In testimony whereof I affix my signature.

VIGGO STEPHAN KELLNER PETERSEN.